Aug. 3, 1954 P. E. BESSIERE 2,685,659
ELECTRODYNAMIC BRAKE
Filed Jan. 26, 1953 3 Sheets-Sheet 2

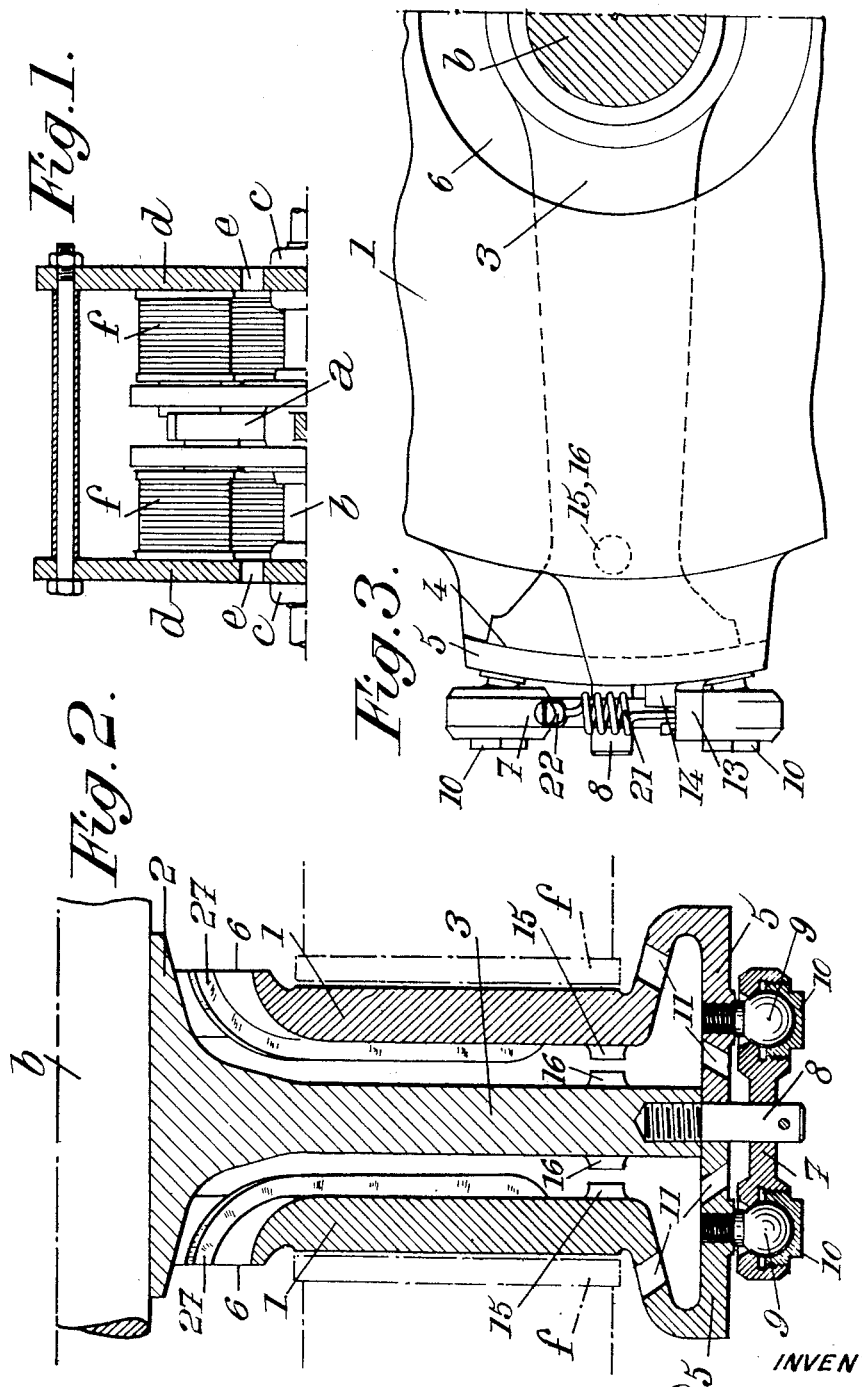

INVENTOR
PIERRE ETIENNE BESSIERE
BY
Bailey, Stephens & Huettig
ATTORNEYS

Aug. 3, 1954   P. E. BESSIERE   2,685,659
ELECTRODYNAMIC BRAKE
Filed Jan. 26, 1953   3 Sheets-Sheet 3
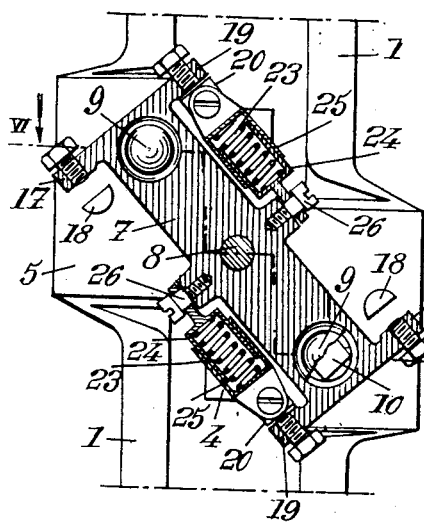
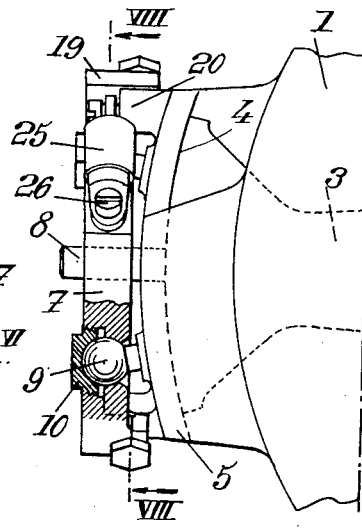
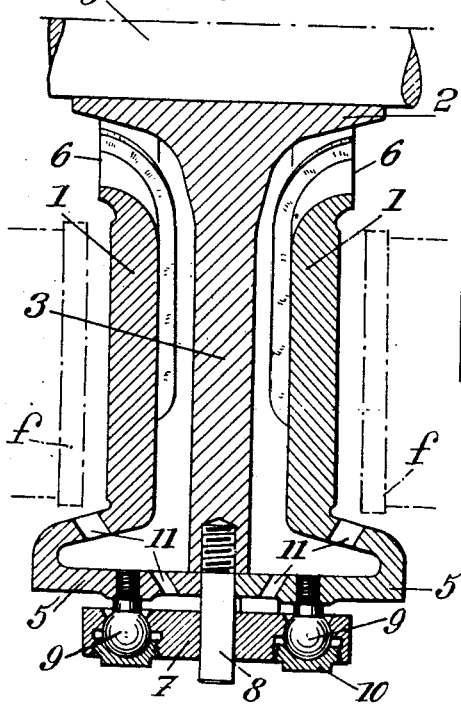
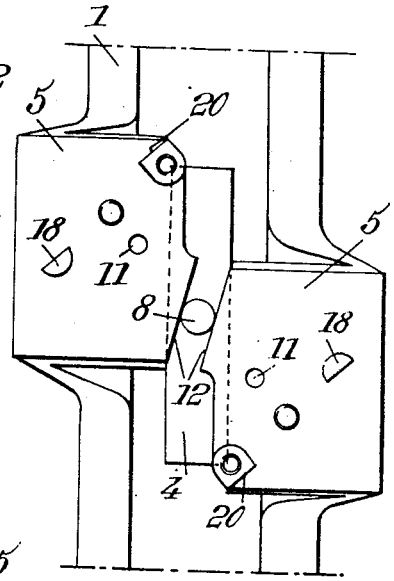
INVENTOR
PIERRE ETIENNE BESSIERE
BY
Bailey Stephens, & Huettig
ATTORNEYS Patented Aug. 3, 1954

2,685,659

UNITED STATES PATENT OFFICE 2,685,659

ELECTRODYNAMIC BRAKE

Pierre Etienne Bessière, Paris, France, assignor to Electro-Mecanique de l'Aveyron, Onet-le-Chateau, pres Rodez, France, a French society Application January 26, 1953, Serial No. 333,285

Claims priority, application France February 14, 1952

10 Claims. (Cl. 310—93)

The present invention relates to electro-dynamic brakes constituted essentially by an inductor which includes two sets of electro-magnets disposed on either side of an armature which rotates with respect to said two sets of electro-magnets and between the pole pieces thereof, whereby Foucault currents are created in this armature and serve to brake the movement thereof with respect to the inductor when the electro-magnets of said inductor are energized by an electric current. Generally, the armature which constitutes the rotor is rigid with the element to be braked, for instance a shaft, and rotates therewith, whereas the inductor, which is then stationary, constitutes the stator of the electro-dynamic brake.

My invention has for its object to provide a brake of this kind which is better adapted to meet the requirements of practice than those existing at the present time.

My invention relates to brakes the rotor of which includes two armature elements each of which cooperates with one of the two sets of electro-magnets and it consists essentially in the fact that the armature elements are mounted in such manner that they can move away from each other under the effect of the pulling force of the electro-magnets, this movement being limited by abutments giving the air gaps a pre-determined small value, return means being provided for urging the armatures toward each other and increasing the air gaps once the pulling force exerted by the electro-magnets ceases to exist.

Preferred embodiments of my invention will be hereinafter described with reference to the accompanying drawings, given merely by way of example, and in which:

Fig. 1 diagrammatically shows, in axial section, an electro-dynamic brake the rotor of which is made according to my invention;

Fig. 2 is a sectional view, on the line II—II of Fig. 4 and on an enlarged scale, of the rotor according to my invention;

Fig. 3 is a part elevational view of the rotor of Fig. 2;

Figs. 6 to 9 are views similar to Figs. 2 to 5 respectively of a rotor made according to a second embodiment of my invention.

Figure 4:
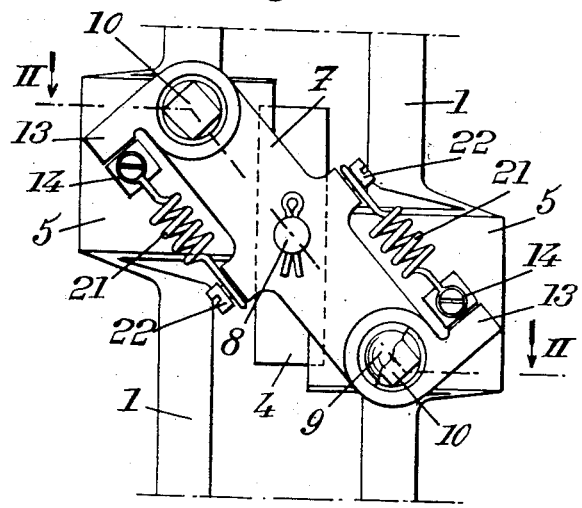
Figs. 4 and 5 are part plan views of the rotor of Fig. 1, respectively with and without a connecting device provided between the armature elements of the rotor.

The braking device according to my invention may be used in combination with an automobile vehicle such as a truck, with a crane, with a mine sounding apparatus, and so on.

The braking device includes a rotor $a$ forming an armature and fixed to a shaft $b$ which constitutes the element to be braked or is connected with this element and which is supported, on either side of rotor $a$, in bearings $c$. These bearings are mounted in the side plates $d$ of a frame, preferably made of a magnetic metal and secured through suitable means to the chassis of the vehicle or other machine fitted with the braking device. Furthermore, these side plates, which are provided, close to bearings $c$, with cooling air inlet orifices $e$, support electro-magnets $f$ forming two sets disposed on either side of rotor $a$ and laterally thereto. Each of the electro-magnets is constituted by a core ending in a pole piece opposite the rotor and surrounded by a winding, the respective windings being mounted either in series or in parallel in an electric circuit which is not shown and which is provided with control and adjustment means (also not shown).

The whole of the electro-magnets and of the magnetic metal frame constitutes the inductor of the electro-dynamic brake.

When an electric current is passed through the windings of the electro-magnets, Foucault currents are produced in the rotor, which produce a powerful braking thereof and also heat it.

Concerning rotor $a$, it includes two armature elements $1$ made of a magnetic material, for instance soft steel, located at a distance from each other in the direction of the axis of shaft $b$. Each of these armature elements has for instance the shape of an annular disc concentric with shaft $b$ and which cooperates with the set of electro-magnets located opposite its outer side, so that it closes the path of the magnetic flux going from one of the electro-magnets of this group to the next electro-magnet thereof, when these electro-magnets are energized by an electric current.

It should be noted here that, in each group, the polarities of the pole pieces of two consecutive electro-magnets of the same set must be of opposed signs respectively, so that the magnetic flux passes through the corresponding disc $1$.

According to the main feature of my invention, the two discs $1$ are mounted in such manner that they can move away from each other under the effect of the pulling force of electro-magnets $f$, their movement away from each other being limited by abutments such that the air gaps between the outer faces of the discs and the pole pieces of the electro-magnets have a very small value, and return means are provided for urging discs 1 and 2 toward each other and thus increasing the air gaps between these discs and the pole pieces of the electro-magnets, when no pulling force is being exerted by them due to the fact that no current is flowing through these electro-magnets.

The fact that the air gap is reduced to a very small value, averaging for instance some tenths of a millimeter, when the electro-magnets are energized, has for its effect considerably to reduce magnetic flux losses resulting from the existence of the air gap, whereby, for a given consumption of energizing current, the Foucault currents created in discs 1 are very important and produce a powerful braking.

On the other hand, the fact that the air gaps may be increased up to a value of at least one centimeter as soon as energizing ceases, enables the cooling air which flows along the outer faces of the discs 1 to pass between them and the pole pieces of the electro-magnets so as thus very efficiently to cool both the pole pieces and the discs where their temperature is maximum. Furthermore, the fact that the air gaps are increased during the periods where the brake is out of action avoids any danger of friction of the outer faces of discs 1 on the pole pieces, which friction would be truly detrimental only during these periods, whereas such a friction during the braking periods would merely add its braking effect to that due to the Foucault currents.

It is clear that a rotor made according to this main feature of my invention may be made in many different ways.

However, it seems particularly advantageous, according to a feature which might be used separately, to have the armature discs carried, close to their periphery, by a support extending inside the interval between these discs and itself fixed to the shaft to be braked, the armature discs including, in their central portion, apertures having an uninterrupted outline and of a diameter larger than that of the shaft, whereby these discs have no direct contact therewith, which ensures a very efficient thermal insulation between the shaft and the armature discs which constitute the hottest portion of the rotor. By further sending a cooling stream through the interval between the two discs of the rotor, I achieve a very efficient cooling not only of the inner surfaces of these discs but also of the support extending between them, whereby the amount of heat which can be transmitted to the shaft through the intermediate of this support is very small, and even equal to zero.

Since the shaft is thus protected against important heating actions, it is not exposed to elongations which, in known electro-dynamic brakes, often produce unequal variations of the air gaps. Such unequal variations have detrimental consequences, such as high thrusts exerted on the bearings of the shaft, variations in the braking device efficiency and dissymmetrical stresses exerted upon the rotor, which stresses may result in a deformation of said rotor.

In the rotor constructions illustrated by the drawings, discs 1 are carried by a support including a hub 2 secured on shaft b and a plurality of radial arms 3, the number of which is equal at least to three and preferably is odd. The ends of these arms 3 form a cylindrical surface 4 upon which rest the inner surfaces, also cylindrical, of fingers 5 provided at the periphery of discs 1 and which preferably have, in radial section, a U or V shape. The number of these fingers 5 is advantageously equal to the number of arms 3.

I provide, in the central portion of discs 1, apertures 6 the edge of each of which is an uninterrupted circle of a diameter sufficiently great to have uninterrupted annular intervals formed between the edges of these apertures and the hub 2 of the support of discs 1. These uninterrupted intervals on the one hand constitute inlets for the cooling air which, during the operation of the brake, flows in a more or less radial direction through the interval between the discs 1 of the rotor and, on the other hand, prevent direct transmission by conduction of the heat generated in discs 1 to hub 2 and shaft b.

In order to keep discs 1 constantly parallel with respect to each other and to give them equal movements with respect to the middle radial plane of support 2—3, discs 1 are connected together by synchronizing means provided preferably at the periphery of the rotor, beyond the surface of a cylinder surrounding the ends of the pole pieces of electro-magnets f, that is to say in portions of the rotor which are practically outside of the magnetic field and which, on the other hand, are efficiently cooled. This is chiefly important for the hinges of these synchronizing means, which necessitate lubrication and therefore must be located at relatively cold places, where the lubricating grease is not deteriorated by heat.

These synchronizing means consist for instance of levers 7 pivotable about, and slidable along, radial pins 8 fixed to the ends of arms 3. The number of these levers is preferably equal to that of arms 3. Each end of these levers 7 is hinged through a universal joint or a swivel joint or a Cardan joint to one of the discs 1.

In the construction shown by the drawings, levers 7 are hinged to each of the discs 1 by means of a ball 9 fixed to said disc, and preferably to the finger 5 thereof, and held in position on the corresponding end of lever 7 by a threaded cap 10 the inner surface of which is spherical to form a socket for said ball. Apertures 11 are preferably provided in every finger 5 in the vicinity of ball 9 in order to improve the cooling of the joint by the air stream which flows through the interval between discs 1.

Figure 5:
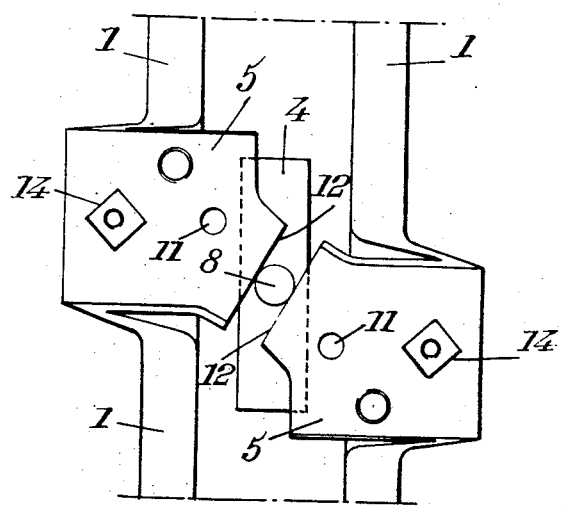

Finally, at least a portion of the inner edges of fingers 5 is arranged to form oblique guiding surfaces 12 (see Figs. 5 and 9) cooperating with the corresponding pin 8. The surfaces 12 belonging to the two respective discs of the rotor are in contact with pin 8 at diametrally opposed points thereof, respectively.

When the distance between discs 1 undergoes modifications, levers 7 pivot about their respective pivot pins 8 and thus cause discs 1 to have, in addition to their movement in the direction of the axis of shaft b, a relative angular movement about this axis. Advantageously, the longitudinal axis of every lever 7, seen in plan view, always makes an angle with the axis of shaft b, this angle being minimum when the distance between discs 1 is maximum and being maximum when this distance is minimum.

Preferably, the synchronizing means are further combined with at least one of the abutments which limit the maximum and minimum distance between discs 1. For instance, in the disc construction illustrated by Figs. 2 to 5, every lever 7 is provided, at each end thereof, with a transverse finger 13 which is applied against an abutment 14, fixed on the finger 5 of each disc 1, when the discs are at the maximum distance from each other. The minimum distance between the discs is determined, in the case of the rotor illustrated by Figs. 2 to 5, by abutments 15 and 16 disposed respectively on the inner sides of discs 1 and on either side of every arm 3, advantageously in the vicinity of the periphery of the discs.

In the rotor construction illustrated by Figs. 6 to 9, the synchronizing means are combined with abutments which determine the two limits of relative displacement of discs 1. This is why, in this case, levers 7 are provided not only with transverse arms 17 arranged to cooperate with abutments 18 carried by fingers 5, to determine the maximum distance between the discs, but also, on the other side, with other arms 19 cooperating with abutments 20 also fixed to fingers 5 and serving to determine the minimum distance between discs 1.

The return means which urge discs 1 toward each other may be made in many different ways. For instance, they may be constituted by springs. In order to protect them as much as possible against the action of the heat generated by the rotor, these springs are preferably disposed in the vicinity of the periphery of the rotor, at places which are well cooled and practically outside of the magnetic field produced by the electro-magnets.

According to an embodiment which seems to be particularly advantageous, these return means are arranged to act upon the synchronizing means. For instance, in the rotor construction illustrated by Figs. 2 to 5, pulling springs 21 are interposed between lever 7 and each of the fingers 5 of the two discs 1. One of the ends of each spring may be fixed to lever 7, in a plane perpendicular to the longitudinal plane of lever 7 and at points 22 located on either side of its pivot pin 8, at equal distances from this pin, whereas the other end of each spring 21 may be fixed to the abutment 14 of the corresponding finger 5.

In the rotor construction illustrated by Figs. 6 to 9, these return springs are constituted by springs 23 acting by compression and disposed inside two telescopic cylinders 24 and 25. One of the ends of each of these cylinders is fixed to lever 7 at points 26 located on either side of pin 8, whereas the other cylinder end is hinged to one finger 5, preferably where abutments 20 are located.

The rotor assembly according to my invention may further include fins or blades 27 disposed on the inner side of each disc 1 and extending from the aperture 6 of each disc toward its periphery, and this in particular at points of these discs which are not located opposite the arms 3 of the disc support.

The operation of the brake according to my invention and more particularly of its rotor is as follows:

When the electro-magnets are energized by an electric current so as to brake the rotor, armature discs 1 move away from each other and away from arms 3 until abutments 13 and 14 or 17 and 18 are applied against each other. At this time the air gap, that is to say the interval between the outer surface of discs 1 and the corresponding ends of the pole pieces of electro-magnets f is only some tenths of a millimeter. For a given energizing of the pole pieces, I therefore obtain a very high magnetic flux, which closes through discs 1 and creates in these discs important Foucault currents, giving rise to a braking action which is also important. Due to the movement of the discs away from each other, springs 21 or 23 have been stressed. As soon as the electro-magnets cease to be energized, the springs bring the discs toward each other until abutments 15 and 16 or 19 and 20 are in contact with each other. Thus I obtain the minimum distance between the discs, whereas the air gap between these discs and the corresponding electro-magnets is maximum and may reach a value of one centimeter or even more.

Rotation of the rotor produces an intensive air circulation through the rotor and the whole electro-dynamic brake. The rotor acting as a fan sucks in air from the outside, this air entering for instance through apertures e, of the frame, after which a portion thereof flows through the interval between discs 1, entering this interval through apertures 6, and another portion flows along the outer surfaces of discs 1, from the center toward the periphery. The cooling effect of this air on the external surface of the discs is particularly great when discs 1 have been allowed to move away from the pole pieces of the electro-magnets, thus affording large passages for the cooling air between these pole pieces and the outer surfaces of the discs.

In a general manner, while I have, in the above description, disclosed what I deem to be practical and efficient embodiments of my invention, it should be well understood that I do not wish to be limited thereto as there might be changes made in the arrangement, disposition and form of the parts without departing from the principle of the present invention as comprehended within the scope of the accompanying claims.

What I claim is:

1. For use in connection with a structure including a frame and a shaft rotatable in said frame, an electro-dynamic brake which comprises, in combination, an armature constituted by a rotor mounted on said shaft to rotate together therewith and an inductor rigid with said frame constituted by two sets of electro-magnets carried by said frame and disposed respectively laterally of said rotor on opposite sides thereof respectively, said rotor including two disc-shaped armature elements located each opposite one set of electro-magnets and movable with respect to each other in the direction of the axis of said shaft, whereby said armature elements can be pulled away from each other under the effect of the pulling force of said electromagnets, abutment means for limiting the displacements of said armataure elements away from each other, and yielding return means for urging said armature elements toward each other.

2. For use in connection with a structure including a frame and a shaft rotatable in said frame, an electro-dynamic brake which comprises, in combination, an armature constituted by a rotor mounted on said shaft to rotate together therewith and an inductor rigid with said frame constituted by two sets of electro-magnets carried by said frame and disposed respectively laterally of said rotor on opposite sides thereof respectively, said rotor including two disc-shaped armature elements located each opposite one set of electro-magnets and movable with respect to each other in the direction of the axis of said shaft, whereby said armature elements can be pulled away from each other under the effect of the pulling force of said electro-magnets, abutment means for limiting the displacements of said armature elements away from each other, yielding return means for urging said armature elements toward each other, a support for said armature elements carried by said shaft in fixed position in the axial direction thereof, between said armature elements, and synchronizing means interposed between said armature elements and mounted on said support for compelling said armature elements to have equal axial displacements in opposite directions with respect to said support.

3. For use in connection with a structure including a frame and a shaft rotatable in said frame, an electro-dynamic brake which comprises, in combination, an armature constituted by a rotor mounted on said shaft to rotate together therewith and an inductor rigid with said frame constituted by two sets of electro-magnets carried by said frame and disposed respectively laterally of said rotor on opposite sides thereof respectively, said rotor including two disc-shaped armature elements located each opposite one set of electro-magnets and movable with respect to each other in the direction of the axis of said shaft, whereby said armature elements can be pulled away from each other under the effect of the pulling force of said electro-magnets, abutment means for limiting the displacements of said armature elements away from each other, yielding return means for urging said armature elements toward each other, a support carried by said shaft in fixed position in the axial direction thereof and synchronizing levers pivoted at their middle points to said support about respective axes radial with respect to the shaft axis, the ends of said levers being hinged to said armature elements respectively.

4. A brake according to claim 2 in which said synchronizing means are provided at the periphery of the rotor constituted by two disc-shaped armature elements and are located on the outside of a geometrical cylinder surrounding the pole pieces of the electro-magnets.

5. A brake according to claim 2 in which said synchronizing means are combined with said abutment means.

6. A brake according to claim 1 in which said return means are disposed at the periphery of the discs constituting the armature elements of the rotor.

7. A brake according to claim 2 in which said return means, constituted by springs, are mounted on said synchronizing means.

8. A brake according to claim 1 in which said disc-shaped armature elements are provided, in their central portion, with apertures the edges of which surround said shaft at a distance thereof and without discontinuity.

9. A brake according to claim 2 further including fingers carried by said disc-shaped elements at the periphery thereof, extending inwardly with respect to said rotor and resting on the periphery of said support so as to be able to slide with respect to this periphery.

10. A brake according to claim 8 in which the support is constituted by a hub fixed on said shaft and by a plurality of radial arms provided at their ends with surfaces on which the fingers of the disc-shaped elements can bear.

References Cited in the file of this patent

UNITED STATES PATENTS

| Number | Name | Date |
|---|---|---|
| 2,110,663 | Gouldthorpe | Mar. 8, 1938 |
| 2,453,509 | Hugin | Nov. 9, 1948 |
| 2,610,843 | Schellenberger | Sept. 16, 1952 |